United States Patent [19]

Masaki

[11] Patent Number: 4,825,389

[45] Date of Patent: Apr. 25, 1989

[54] PRINT DATA EDITING CIRCUIT IN SERIAL PRINTER

[75] Inventor: Hideo Masaki, Tokyo, Japan

[73] Assignee: Kabushiki Kaisha Toshiba, Kawasaki, Japan

[21] Appl. No.: 870,372

[22] Filed: Jun. 4, 1986

[30] Foreign Application Priority Data

Jun. 12, 1985 [JP] Japan .................................. 60-126189

[51] Int. Cl.⁴ ........................... B41J 3/12; G06F 3/12
[52] U.S. Cl. ...................................... 364/519; 400/121
[58] Field of Search ................. 364/519; 400/121, 124

[56] References Cited

U.S. PATENT DOCUMENTS 4,459,050  7/1984  Goldberg et al. ............... 400/124 X
4,487,515 12/1984  Harris ............................... 400/124 X
4,508,463  4/1985  Wang et al. ........................ 400/124

Primary Examiner—David L. Clark
Attorney, Agent, or Firm—Finnegan, Henderson, Farabow, Garrett, & Dunner

[57] ABSTRACT

In a print data editing circuit in a serial printer of the invention, print data signals for odd pins (P1, P3, P9, P11, P17, P19) and other odd pins (P5, P7, P13, P15, P21, P23) in print data supplied from a buffer RAM are sequentially shifted and stored in first and second registers in response to a first write signal. Similarly, print data signals for even pins (P2, P4, P10, P12, P18, P20) and other even pins (P6, P8, P14, P16, P22, P24) are sequentially shifted and stored in third and fourth registers in response to a second write signal. The print data signals from the first through fourth registers are respectively latched by first through fourth buffer registers in response to an interrupt signal from a timer. The data signals are simultaneously output from the first through fourth buffer registers and supplied to a pin drive circuit.

3 Claims, 7 Drawing Sheets

FIG. 6A WRITE SIGNAL g
FIG. 6B WRITE SIGNAL f
FIG. 6C WRITE SIGNAL d
FIG. 6D EXCITING SIGNAL e
FIG. 6E PIN DATA SIGNAL h1
FIG. 6F PIN DATA SIGNAL h2

PRINT DATA EDITING CIRCUIT IN SERIAL PRINTER

BACKGROUND OF THE INVENTION

The present invention relates to a print data editing circuit in a serial printer.

In a printer having printing pins arranged in a print data, a data translation program is stored in a control ROM to offset timings of arrays of odd and even numbered printing pins according to the print data. A CPU controls a pin data output port of a print data editing circuit according to the control program so as to achieve proper printing.

FIG. 1 illustrates a pin data output port of a conventional serial printer having a 24-pin printing head. The output port includes registers 1 through 4 and 3-input OR gate 5. Each register consists of eight D flip-flops. The output terminal of OR gate 5 is connected to the clock input terminal of register 1. Write signals a, b, and c are supplied from a CPU (not shown) to OR gate 5. OR gate 5 supplies an ORed output signal to the clock input terminal of register 1 through one-bit signal line 10. Register 1 also receives 8-bit print data through data bus 6 from a print data memory (not shown) for storing print data. The 8-bit print data is latched by register 1 in response to the clock signal as the ORed output signal. Register 2 receives, through 4-bit signal line 11, 4-bit data (corresponding to odd pins) among the print data supplied through data bus 6. Register 2 also receives the 4-bit data (corresponding to odd pins) supplied from register 1 through 4-bit signal line 13. A total of 8-bit data is latched by register 2 in response to the clock signal as control signal a supplied through line 7. Register 3 latches 8-bit print data (a sum of 4-bit print data corresponding to even pins and 4-bit print data corresponding to odd pins) of register 1 in response to the clock signal as control signal b supplied through line 8.

A total of 4-bit data corresponding to even pins from register 1 and 4-bit data (corresponding to even pins) among the print data supplied through data bus 6 is supplied to register 4 in response to the clock signal as control signal c supplied through signal line 9.

The print data memory is addressed in units of 8 bits, as shown in FIG. 2. FIG. 3 shows a printing head when viewed from the platen. A distance between the even pins in one column and the odd pins in the other column is set to be 9 dots. Addresses m through m+29 are required for the print data memory to set data for these printing pins. Data setting starts with the odd pins in the other column but printing starts with the even pins in one column. Print data signals for pins P1, P3, P5, and P7 are respectively stored in odd bits at address m. Print data signals for pins P9, P11, P13, and P15 are respectively stored in odd bits at address m+1. Print data signals for pins P17, P19, P21, and P23 are respectively stored in odd bits at address m+2. Subsequently, print data signals for pins P2, P4, P6, and P8 are respectively stored in even bits at address m+27, print data signals for pins P10, P12, P14, and P16 are respectively stored in even bits at address m+28, and print data signals for pins P18, P20, P22, and P24 are respectively stored in even bits at address m+29. The print data signals in an order of addresses m, m+1, m+2, m+27, m+28, and m+29 are are supplied to the pin output port. Upon sending of the print data at address m or m+1 to the pin data output port, write signal a is also supplied thereto. Similarly, upon sending of the print data at address m+2 or m+27 to the pin data output port, write signal b is then supplied; and upon sending of the print data at address m+28 to the pin data output port, write signal c is sent thereto.

When print data at address m is sent to the pin data output port, odd bit print data at the same address is stored in register 1. When print data at address m+1 is sent to the pin data output port, a sum of odd bit print data at address m and odd bit print data at address m+1 is stored in register 2. Upon sending of print data at address m+2 to the pin data output port, print data at the same address is stored in register 1. Upon sending of print data at address m+27, a sum of odd bit print data at address m+2 and even bit print data at address m+27 is stored in register 3.

Upon sending of print data at address m+28 to the pin data output port, it is stored in register 1, and odd bit print data at address m+1 is stored in register 2. Upon sending of print data at address m+29 to the pin data output port, a sum of even bit print data at address m+28 and even bit print data at address m+29 is stored in register 4.

The odd bit print data and the even bit print data are stored in registers 2, 3, and 4. The even bit print data and the even bit print data are sent from registers 2, 3, and 4 to the corresponding drivers of the printing head pins, thereby performing printing.

A conventional print data editing circuit, however, requires three signal lines for sending the write signals, an OR gate for logically ORing the write signals, and four 8-bit registers, resulting in a complicated circuit arrangement.

SUMMARY OF THE INVENTION

It is an object of the present invention to provide a simple print data editing circuit in a high-speed serial printer.

In order to achieve the above object of the present invention, there is provided a print data editing circuit in a serial printer having printing pins arranged staggering in two columns, and the corresponding driver means for driving the pins comprising:

a print data memory for storing print data;

a first memory for storing the print data corresponding to pins in one of the two columns;

a second memory for storing the print data corresponding to pins in the other of the two columns; and control means for sequentially shifting the print data in said first memory and the print data in said second memory and controlling timings for setting the print data to the respective driver means corresponding to the individual pins arranged in the two columns.

In the print data editing circuit in a serial printer according to the present invention, the pin data output port arrangement can be simplified. Although the conventional arrangement requires three write signal lines, an OR gate for logically ORing the write signals, and four 8-bit registers, the simplest arrangement of the present invention requires four 4-bit registers and two one-bit signal lines.

BRIEF DESCRIPTION OF THE DRAWINGS

Other objects and features of the present invention will be apparent from the following description taken in connection with the accompanying drawings, in which:

FIGS. 6A through 6F are timing charts in the pin data output port shown in FIG. 5, in which FIG. 6A shows write signal g, FIG. 6B shows write signal f, FIG. 6C shows interrupt signal d, FIG. 6D shows exciting signal e, FIG. 6E shows pin data signal h1, and FIG. 6F shows pin data signal h2.

DETAILED DESCRIPTION OF THE PREFERRED EMBODIMENTS

Figure 1:
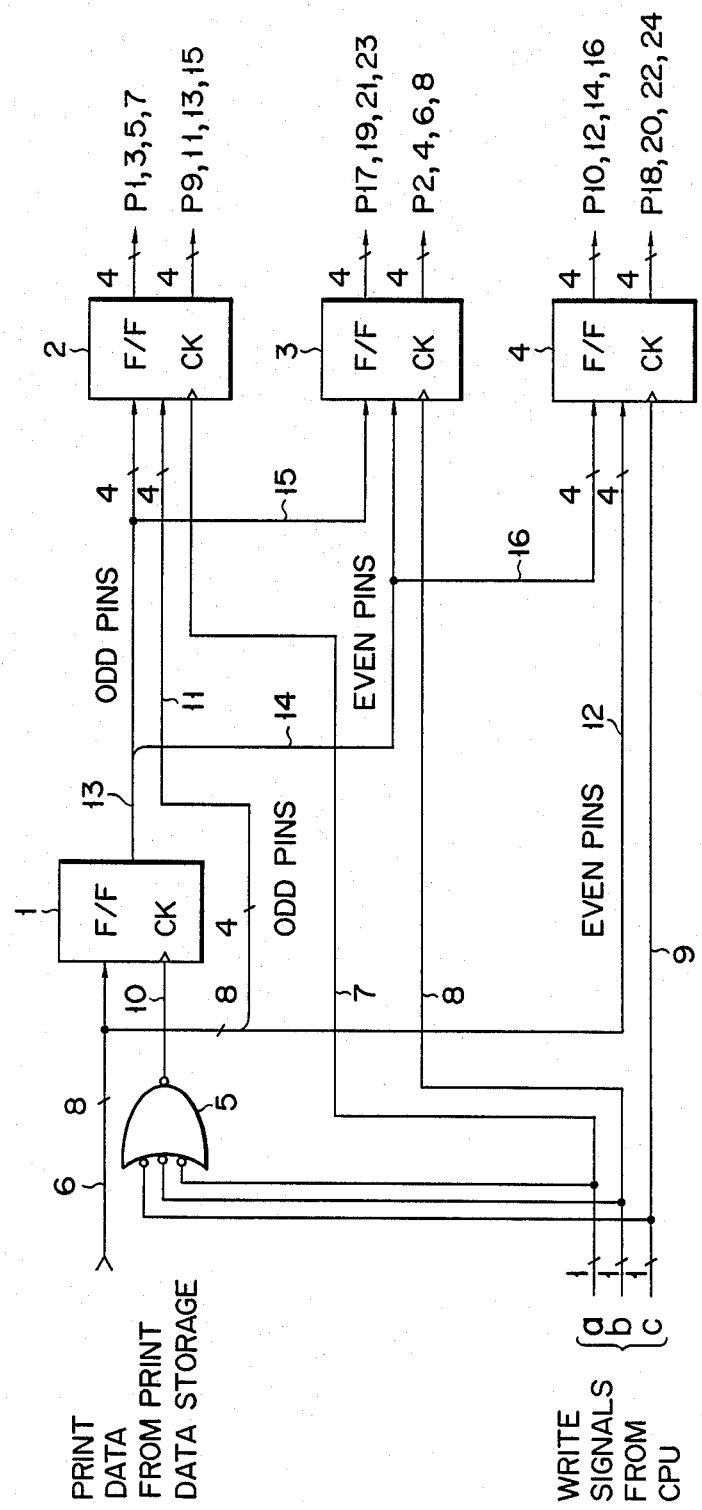
FIG. 1 is a block diagram of a pin data output port used in a conventional serial printer.
Figure 2:
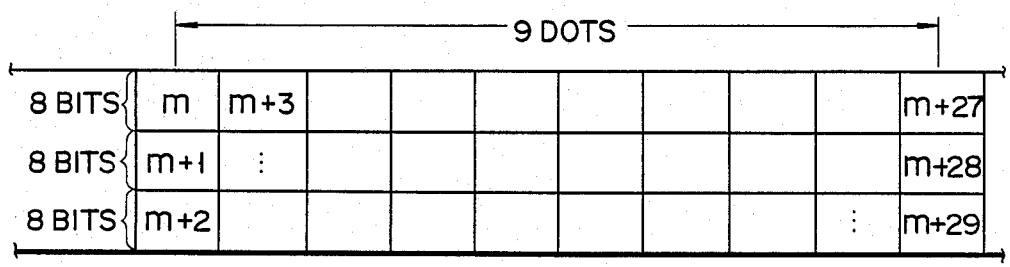
FIG. 2 is a data table of a print data memory.
Figure 3:
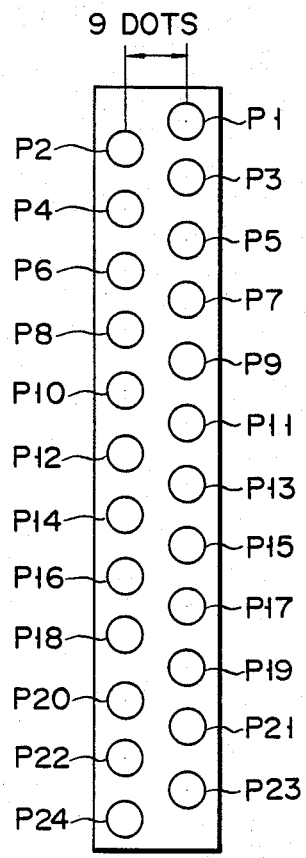
FIG. 3 is a plan view showing the pin disposition of the printing head.
Figure 4:
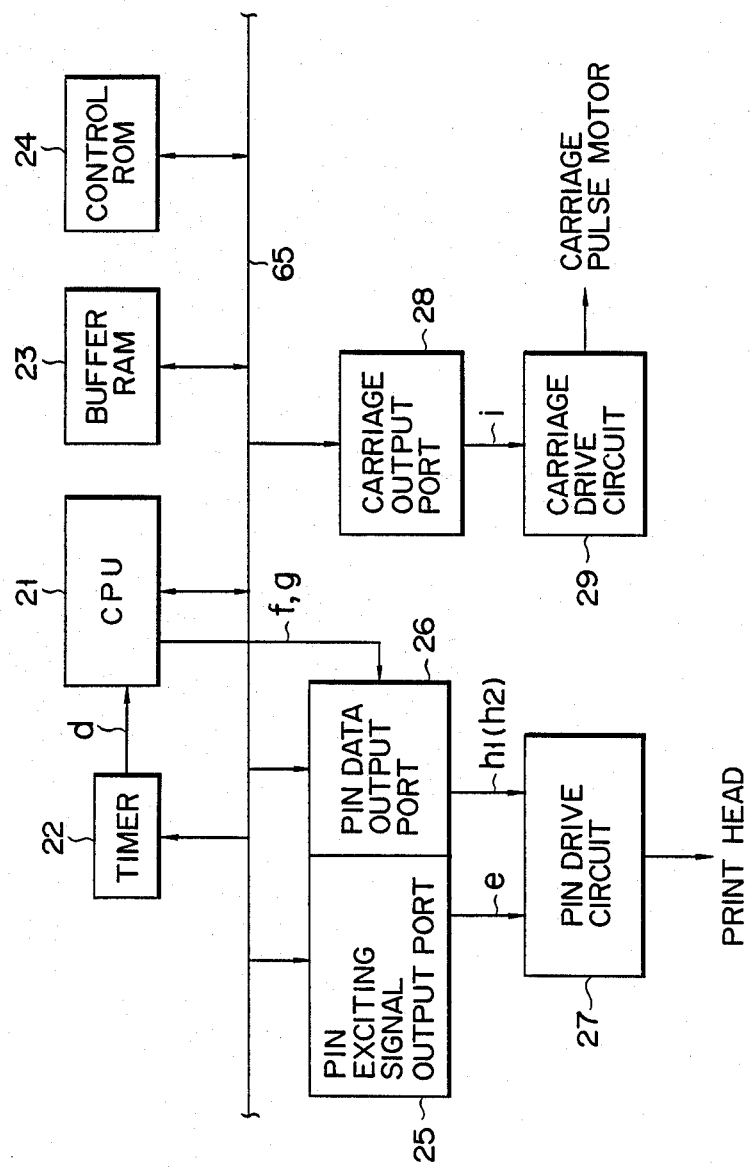
FIG. 4 is a block diagram of a print data editing circuit in a serial printer according to an embodiment of the present invention.

FIG. 4 shows the arrangement of a 24-pin printing head serial printer employing a print data editing circuit according to the present invention.

Data bus 65 is connected to central processing unit (CPU) 21, for controlling the entire system, buffer random access memory (RAM) 23 for storing print data, control read only memory (control ROM) 24 for storing control programs of CPU 21 and printing data, and timer 22 for supplying interrupt signal d to CPU 21 at predetermined timings. Bus 65 is also connected to pin exciting signal output port 25 for generating pin exciting signal e for the printing head, pin data output port 26 for outputting pin data signal h1 (h2) in response to write signals f and g, and carriage output port 28 for outputting carriage pulse motor drive signal i. Pin drive circuit 27 is connected to output ports 25 and 26 to amplify exciting signal e and data signal h1 (h2) so as to drive the corresponding head pin. Carriage drive circuit 29 is connected to output port 28 to amplify drive signal i from port 28, thereby driving the carriage pulse motor.

The operation of the above embodiment will be described below.

The control program stored in control ROM 24 runs under the control of CPU 21 to send the printing data from buffer RAM 23 to data output port 26. RAM 23 is addressed in units of 8 bits. Assume that print data signals for printing pins P1, P3, P5, and P7 in the other of two columns are respectively stored in odd bits at address n, that printing signals for printing pins P9, P11, P13, and P15 in one of the two columns are respectively stored in the odd bits at address n+1, that print data signals for printing pins P17, P19, P21, and P23 in one of the two columns are respectively stored in the odd bits at address n+2, that print data signals for printing pins P2, P4, P6, and P8 in the other of the two columns are respectively stored in even bits at address n+27, that print data signals for printing pins P10, P12, P14, and P16 in the other of the two columns are respectively set in the even bits at address n+28, and that print data signals for printing pins P18, P20, P22, and P24 in the other of the two columns are respectively stored in the even bits at address n+29. CPU 21 sequentially sends these print data signals to data output port 26 in an order of addresses n, n+1, n+2, n+27, n+28, and n+29.

Figure 5:
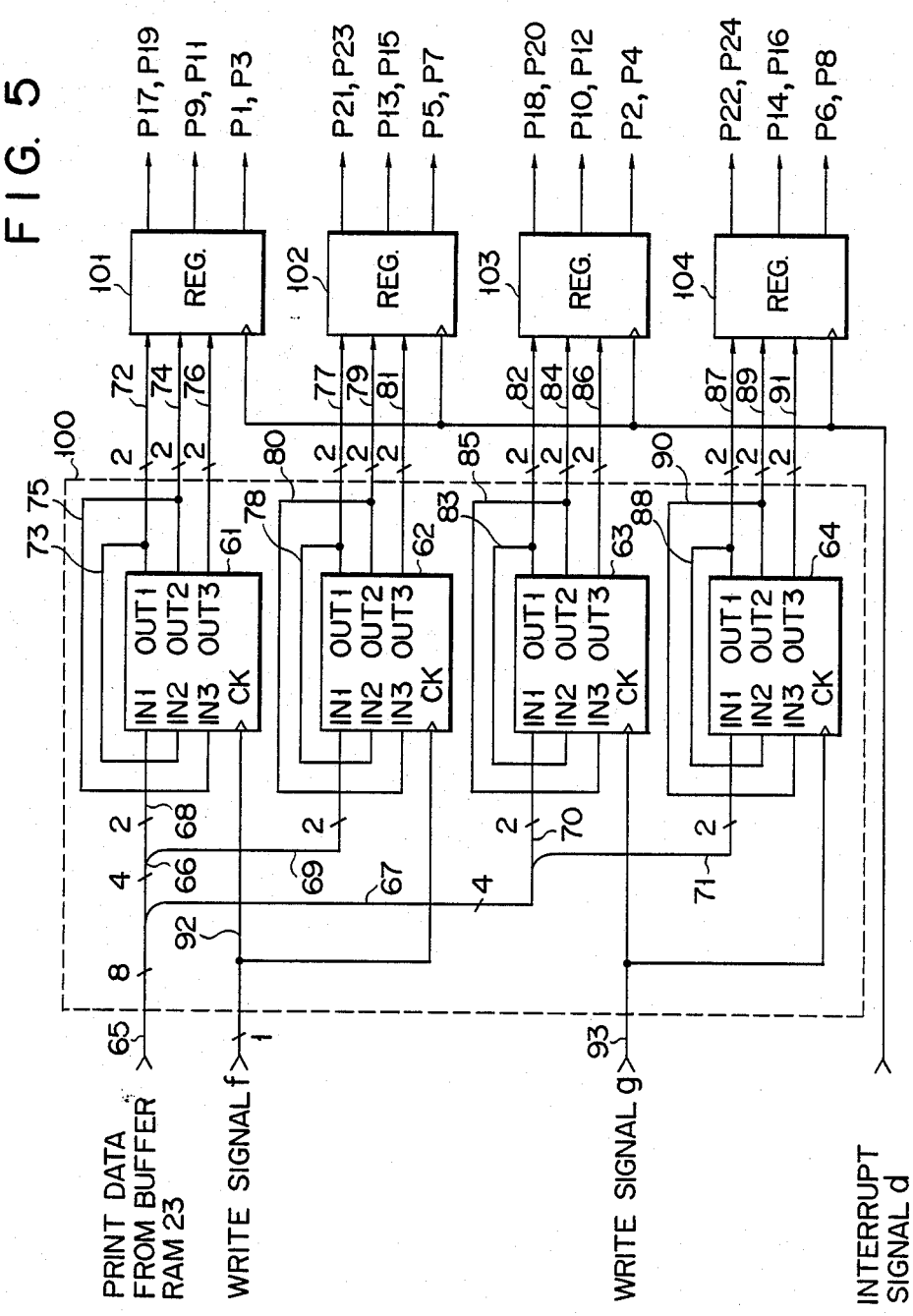
FIG. 5 is a detailed block diagram of a pin data output port in the circuit of FIG. 4.

FIG. 5 illustrates the detailed arrangement of pin data output port 26. Referring to FIG. 5, data output port 26 comprises four 6-bit registers 61 through 64, 8-bit data bus 65, 4-bit signal lines 66 and 67, 2-bit data signal lines 68 through 91, one-bit write signal lines 92 and 93, and buffer registers 101 through 104. Register 61 receives upper two odd bits of the 8-bit data from terminal IN1 through 2-bit data lines 66 and 68, and stores the 2-bit data in response to write signal f (FIG. 6B) supplied through line 92. The 2-bit data stored through terminal IN1 of register 61 is output from terminal OUT1 thereof. The output 2-bit data is stored in buffer register 101 and, at the same time, fed back to terminal IN2 of register 61. The 2-bit data stored in response to write signal f through terminal IN2 of register 61 is output from terminal OUT2 thereof and is stored in buffer register 101. At the same time, the output data is fed back to terminal IN3 of register 61. The 2-bit data stored through terminal IN3 of register 61 in response to write signal f is output from terminal OUT3 thereof and stored in buffer register 101.

Register 62 receives the lower two odd bits of the 8-bit data from data bus 65 at terminal IN1 through signal lines 66 and 69 and stores 2-bit data in response to signal f sent through signal line 92. Register 63 receives the upper two even bits of the 8-bit data from data bus 65 at terminal IN1 through 4-bit data line 67 and 2-bit data line 70, and stores the 2-bit data in response to write signal g (FIG. 6A) supplied through write signal line 93. Register 64 receives the lower two even bits of the 8-bit data from bus 63 at terminal IN1 through 4-bit data line 67 and 2-bit data line 71 and stores the 2-bit data in response to signal g supplied through write signal line 93.

The 2-bit data signals stored at terminals IN1 of registers 62, 63, and 64 are output from terminals OUT1 thereof in the same manner as register 61, and are stored in buffer registers 102, 103, and 104, respectively. At the same time, the output signals are fed back to terminals IN2 of registers 62, 63, and 64. The 2-bit data signals stored at terminals IN2 in response to signal f or g are output from terminals OUT2 and stored in buffer registers 102, 103, and 104, respectively. These output signals are also fed back to terminals IN3 of registers 62, 63, and 64. The 2-bit data signals stored at terminals IN3 in response to signal f or g are output from terminals OUT3 and are stored in registers 102, 103, and 104, respectively.

Figure 6:
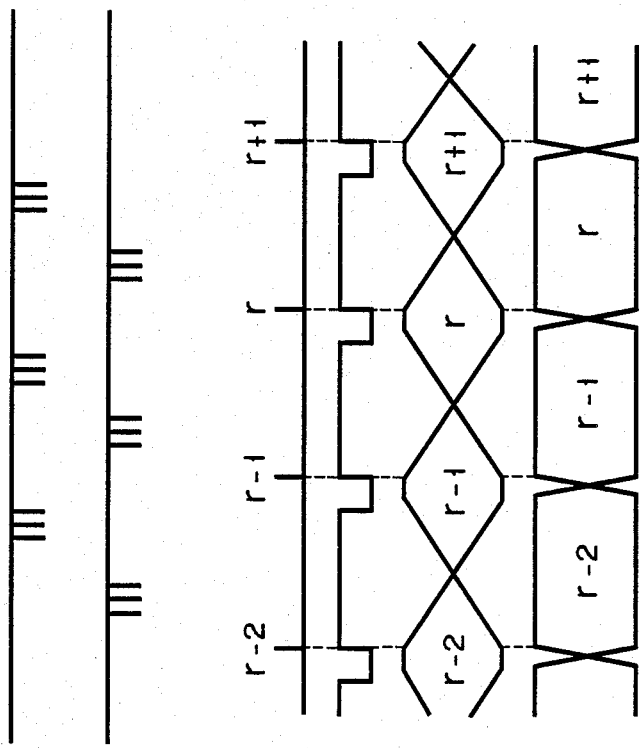

In the pin data output port of FIG. 5, print data at address n is read out from buffer RAM 23 in FIG. 4 and sent onto data bus 65. At the same time, write signal f in FIG. 6B is sent onto write signal line 92. The print data signals for odd pins P1 and P3 are stored in register 61 through its terminal IN1. Print data signals for odd pins P5 and P7 are stored at terminal IN1 of register 62 through 2-bit data line 69.

Print data at address n+1 is output onto data bus 65, and at the same time signal f shown in FIG. 6B is output onto line 92. The print data signals for odd pins P1 and P3 are fed back and shifted from terminal OUT1 to terminal IN2 of register 61. The print data signals for odd pins P9 and P11 are stored in register 61 through its terminal IN1. The print data signals for odd pins P5 and P7 are fed back and shifted from terminal OUT1 to terminal IN2 of register 62 so that the print data signals for pins P13 and P15 are stored in register 62 through terminal IN1.

Print data at address n+2 is output onto data bus 65, and write signal f in FIG. 6B is output onto write signal line 92. The print data signals for odd pins P1 and P3 are fed back and shifted from terminal OUT2 to terminal IN3 of register 61, and the print data signals for odd pins P9 and P11 are fed back and shifted from terminal OUT1 to terminal IN2 of register 61. The print data signals for odd pins P17 and P19 are stored in register 61 through its terminal IN1. The print data signals for odd pins P5 and P7 are fed back and shifted from terminal OUT2 to terminal IN3 of register 62, the print data signals for odd pins P13 and P15 are fed back and shifted from terminal OUT1 to terminal IN2, and print data signals for odd pins P21 and P23 are stored in register 62 through its terminal IN1.

Similarly, print data at address n+27 is output onto data bus 65 and, at the same time, write signal g in FIG. 6A is output onto write signal line 93. The print data signals for even pins P2 and P4 are stored in register 63 through its terminal IN1. The print data signals for even pins P6 and P8 are stored in register 64 through its terminal IN1.

Print data at address n+28 is output onto data bus 65 and, at the same time, write signal g in FIG. 6A is output onto write signal line 93. The print data signals for even pins P2 and P4 are fed back and shifted from terminal OUT2 to terminal IN3 and the print data signals for even pins P10 and P12 are stored in register 63 through its terminal IN1. The print data signals for even pins P6 and P8 are fed back and shifted from terminal OUT1 to terminal IN2 and the print data signals for even pins P14 and P16 are stored in register 64 through terminal IN1.

Print data at address n+29 is output onto data bus 65 and, at the same time, write signal g in FIG. 6A is output onto write signal line 93. The print data signals for even pins P2 and P4 are fed back and shifted from terminal OUT2 to terminal IN3, the print data signals for even pins P10 and P12 are fed back and shifted from terminal OUT1 to terminal IN2, and the print data signals for even pins P18 and P20 are stored in register 63 through its terminal IN1. The print data signal for even pins P6 and P8 are fed back and shifted from terminal OUT2 to terminal IN3, the print data signals for even pins P14 and P16 are fed back and shifted from terminal OUT1 to terminal IN2, and the print data signals for even pins P22 and P24 are stored in register 64 through its terminal IN1.

The data signals stored in buffer registers 101, 102, 103, and 104 are simultaneously output in response to the interrupt signal from CPU 21. Upon reception of interrupt signal d from timer 22, CPU 21 detects that all the data signals are latched by buffer registers 101, 102, 103, and 104 and performs the following setting. As shown in the timing charts of FIGS. 6A through 6F, the timing for setting the rth print data signal may be the exciting timing of the printing pin by the (r−1)th print data signal. Pin data signal h1 in FIG. 6E is a pin data signal output from circuit 100 in FIG. 5. Pin data signal h2 in FIG. 6F is a pin data signal output from buffer registers 101, 102, 103, and 104.

When print data is set in pin data output port 26, CPU 21 causes pin exciting signal output port 25 to supply pin exciting signal e in FIG. 6D and pin data output port 26 to supply pin data signal h2 in FIG. 6F to pin drive circuit 27. At the same time, CPU 21 causes carriage output port 28 to supply drive signal i to carriage drive circuit 29.

Drive circuit 27 receives and amplifies exciting signal e in FIG. 6D and data signal h2 in FIG. 6F, and drives the printing head pins in response to signal h2. Drive circuit 27 receives and amplifies drive signal i. Amplified drive signal i is supplied to the carriage pulse motor, which then drives the carriage.

Figure 7:
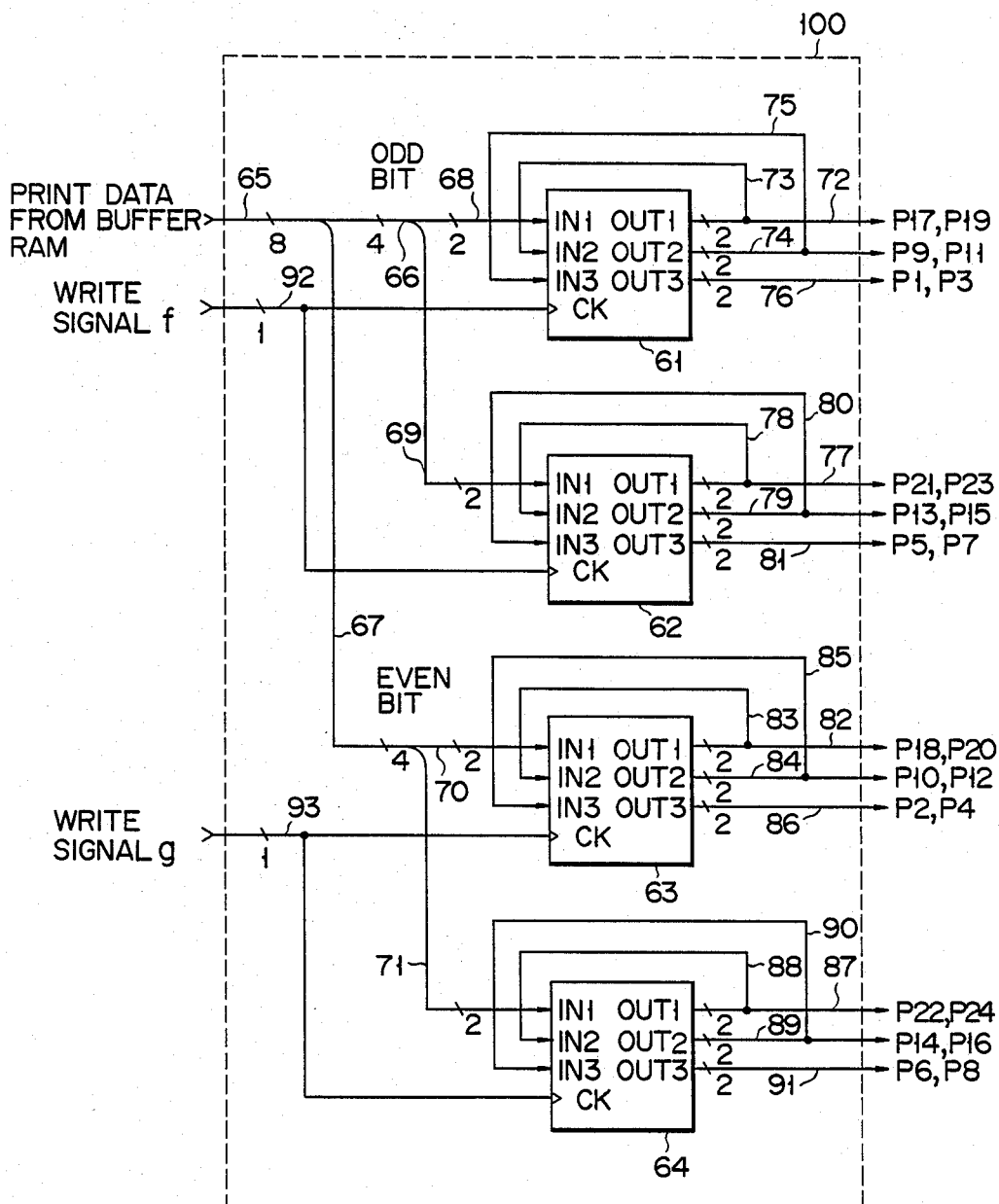
FIGS. 7 and 8 are detailed block diagrams of pin data output ports according to other embodiments of the present invention.

FIG. 7 is a block diagram showing another embodiment of pin data output port 26. In this embodiment, registers 101 through 104 in the embodiment of FIG. 5 are omitted. The same reference numerals in FIG. 7 denote the same parts as in FIG. 5. 2-bit data signals from output terminals OUT1 of registers 61, 62, 63, and 64 are fed back to terminals IN2 thereof and supplied to pin drive circuit 27 in FIG. 4. Similarly, 2-bit data signals from output terminals OUT2 of registers 61, 62, 63, and 64 are fed back to terminals IN3 thereof and supplied to pin drive circuit 27 in FIG. 4. 2-bit data signals from output terminals OUT3 of registers 61 through 64 are supplied to pin drive circuit 27.

In the embodiment of FIG. 7, print data for pins P1 through P24 must be set during a time interval in which printing pins are excited and next pin excitation is started. However, the circuit arrangement can be simplified. The operation of the circuit in FIG. 7 is the same as that in FIG. 5, and a detailed description thereof will be omitted.

Figure 8:
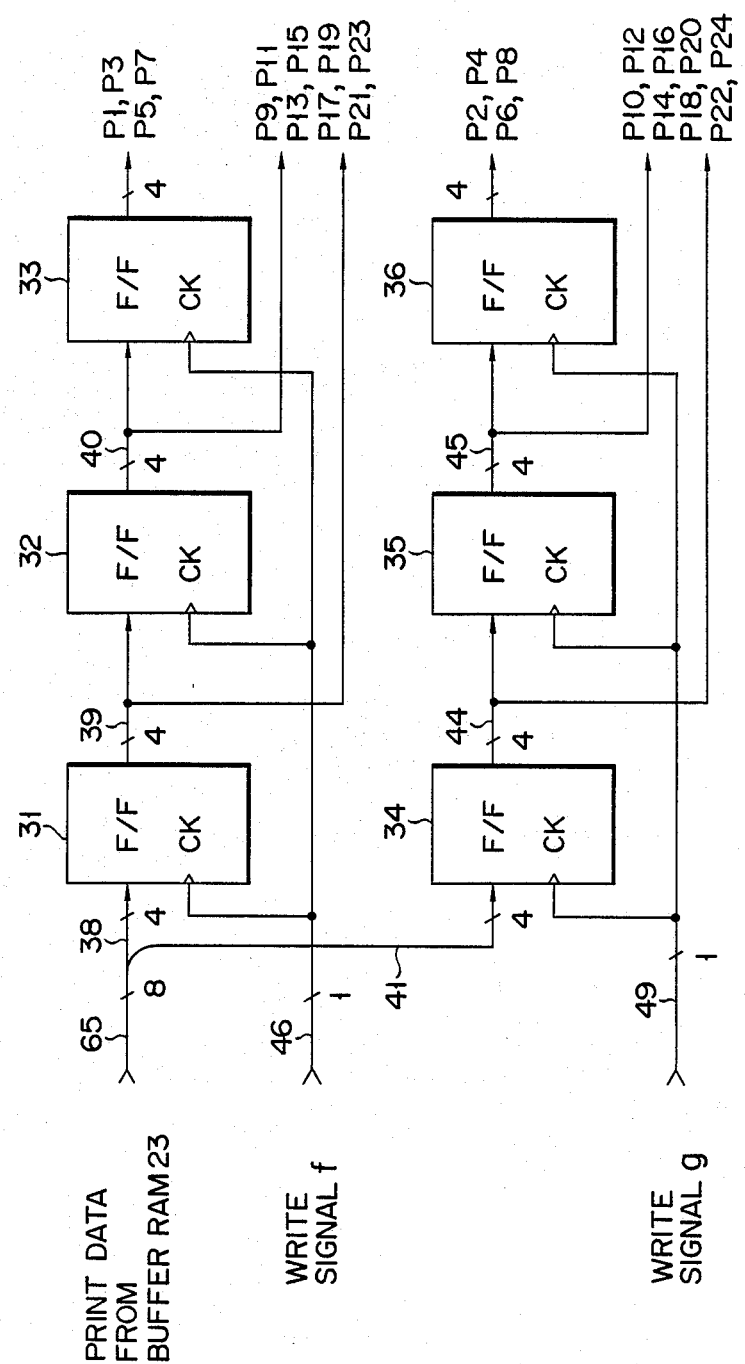

FIG. 8 is a block diagram showing still another embodiment of pin data output port 26.

Referring to FIG. 8, pin data output port 26 comprises six registers 31 through 36, 8-bit data bus 65, 4-bit data lines 38, 39, 40, 41, 44, and 45, and one-bit write signal lines 46 and 49. Each of registers 31 through 36 consists of four registers.

Register 31 receives, through 4-bit data line 38, 4-bit print data (corresponding to odd pins) of 8-bit print data supplied from buffer RAM 23 through data bus 65, and stores the 4bit print data in response to one-bit write signal f supplied through write signal line 46. Register 32 receives 4-bit data output from register 31 through data line 39 and stores the 4-bit print data in response to signal f supplied from CPU 21 through signal line 46. Register 33 receives 4-bit data output from register 32 and stores the 4-bit print data in response to signal f supplied from CPU 21 through line 46.

Register 34 receives, through 4-bit data line 41, 4-bit print data (corresponding to even pins) of 8-bit print data supplied from buffer RAM 23 through 8-bit data bus 65 and stores the 4-bit print data in response to write signal g supplied from CPU 21 through write signal line 49. Register 35 receives a 4-bit output from register 34 through 4bit line 44 and stores the 4-bit print data in response to signal g supplied from CPU 21 through line 49. Register 36 receives a 4-bit output from register 35 through 4-bit line 45 and stores the 4-bit print data in response to signal g supplied from CPU 21 through line 49.

CPU 21 supplies print data of address n in buffer RAM 23 and signal f to pin data output port 26. Register 31 receives this write signal through line 46 and stores 4-bit odd bit print data of address n supplied through line 38.

CPU 21 then supplies print data of address n+1 of buffer RAM 23 and signal f to data output port 26. Register 32 receives signal f through line 46 and stores 4-bit odd bit print data of address n supplied from register 31 through line 39. In response to signal f supplied through line 46, register 31 stores odd bit print data of address n+1 supplied through 8-bit data bus 65 and 4-bit line 38.

CPU 21 supplies print data of address n+2 and signal f to pin data output port 26. In response to signal f supplied through line 46, register 33 stores 4-bit odd bit print data of address n supplied from register 32 through 4-bit data line 40. In response to signal f supplied through line 46, register 32 stores odd bit print data of address n+1 supplied from register 31 through line 39. In response to signal f, register 31 stores 4-bit odd bit print data of address n+2 supplied through bus 65 and line 38.

Odd bit print data at address n is output from register 33 as print data signals for odd pins P1, P3, P5, and P7. Register 32 outputs odd bit print data signals of address n+1 for odd pins P9, P11, P13, and P15 through 4-bit line 40. Register 31 outputs odd bit print data of address n+2 for odd pins P17, P19, P21, and P23 through 4-bit line 39. Therefore, all odd pin print data signals are set.

CPU 21 supplies the print data of address n+27 in buffer RAM 23 and write signal g to pin data output port 26. In response to signal g supplied through line 49, register 34 stores 4-bit even bit print data of address n+27 supplied through data bus 65 and signal line 41.

CPU 21 then supplies the print data of address n+28 in RAM 23 and signal g to pin data output port 26. In response to signal g supplied through signal line 49, register 35 stores the even bit print data of address n+27 supplied from register 34 through 4-bit line 44. In response to signal g supplied through line 49, register 34 stores even bit print data of address n+28 supplied through data bus 65 and 4-bit line 41.

CPU 21 supplies the printing data of address n+29 in buffer RAM 23 and signal g to pin data output port 26. In response to signal g supplied through line 49, register 36 stores the even bit print data of address n+27 supplied from register 35 through 4-bit line 45. In response to signal g supplied through line 49, register 35 stores the 4-bit even bit print data of address n+28 output from register 34 through line 44. In response to signal g, register 34 stores the even bit printing data of address n+29 supplied through data bus 65 and 4-bit line 41.

The even bit print data signals at address n+27 for even pins P2, P4, P6, and P8 are output from register 36. The even bit print data signals at address n+28 for even pins P10, P12, P14, and P16 are output from register 35 through line 45. The even bit print data signals at address n+29 for even pins P18, P20, P22, and P24 are output from register 34 through line 44. Therefore, all even pin print data signals are set.

In the embodiment of FIG. 8, pin data output port 26 is further simplified since it includes four 4-bit registers and two one-bit signal lines.

What is claimed is:

1. A print data editing circuit in a serial printer having printing pins arranged in two staggered columns, and driver means for driving the respective pins, comprising:

print data memory means for storing the print data;
write signal generating means for generating first and second write signals;
first register means for storing, in response to a first occurrence of the first write signal, odd bit print data comprising $2^{N-1}$-bits (N being a positive integer of one or more) among $2^N$-bits of print data stored in said print data memory means at address "m" (m being a positive integer), and for storing, in response to second and third occurrences of the first write signals, odd bit print data comprising $2^{N-1}$-bits among $2^N$-bits of data stored in said print data memory means at addresses "m+1" and "m+2", respectively;

second register means, connected to said first register means, for storing, in response to the second occurrence of the first write signal, odd bit print data comprising said $2^{N-1}$-bits among $2^N$-bits of data at address "m", and for storing, in response to the third occurrence of the first write signal, odd bit print data comprising said $2^{N-1}$-bits among $2^N$-bits of data at address "m+1"; and third register means, connected to said second register means, for storing, in response to the third occurrence of the first write signal, odd bit print data comprising $2^{N-1}$-bits among said $2^N$-bits of print data at address "m", thereby setting the odd bit print data comprising $2^N$-bits to be supplied to said driving means, in said first through third register means;

fourth register means for storing, in response to a first occurrence of the second write signal, even bit print data comprising $2^{N-1}$-bits among $2^N$-bits of print data stored in said print data memory means at address "m+a" (each of m and a being a positive integer), and for storing, in response to second and third occurrences of the second write signals, even bit print data comprising $2^{N-1}$-bits among $2^N$-bits of print data stored in said print data memory means at addresses "m+a+1" and "m+a+2", respectively;

fifth register means, connected to said fourth register means, for storing, in response to the second occurrence of the second write signal, odd bit print data comprising said $2^{N-1}$-bits among $2^N$-bits of print data at address "m+a", and for storing, in response to the third occurrence of the second write signal, even bit print data comprising said $2^{N-1}$-bits among $2^N$-bits of print data at address "m+a+1"; and sixth register means, connected to said fifth register means, for storing, in response to the third occurrence of the second write signal, even bit print data comprising said $2^{N-1}$-bits among $2^N$-bit print data at address "m+a", thereby setting the even bit print data comprising $2^N$-bits to be supplied to said driving means, in said fourth to sixth register means.

2. A print data editing circuit in a serial printer having printing pins arranged in two staggered columns, and driver means for driving the respective pins, comprising:

print data memory means for storing the print data;
write signal generating means for generating first and second write signals;
first register means for storing, in response to first, second and third occurrence of a first write signal, odd bit print data comprising the most significant $2^{N-2}$-bits (N being a positive integer of one or more), among $2^N$-bits of print data stored in said print data memory means at addresses "m", "m+1", and "m+2" (m being a positive integer), respectively;

second register means for storing, in response to the first, second and third occurrences of the first write signal, odd bit print data comprising the least significant $2^{N-2}$-bits (N being a positive integer of one or more), among $2^N$-bit print data stored in said print data memory means at addresses "m", "m+1", and "m+2" (m being a positive integer), respectively;

third register means for storing, in response to the first, second and third occurrences of a second write signal, even bit print data comprising the most significant $2^{N-2}$-bits (N being a positive integer of one or more), among $2^N$-bits of print data stored in said print data memory means at addresses "m+a", "m+a+1", and "m+a+2" (both "m" and "a" being a positive integer), respectively; and fourth register means for storing, in response to the first, second and third occurrences of the second write signal, even bit print data comprising the least significant $2^{N-2}$-bits (N being a positive integer of one or more), among $2^N$-bits of print data stored in said print data memory means at addresses "m+a", "m+a+1", and "m+a+2", respectively, thereby setting, in said first through fourth register means, the odd and even bit print data each comprising $2^{N-2}$-bits to be supplied to said driving means.

3. A print data editing circuit according to claim 2, further comprising first through fourth latch means, connected to said first through fourth register means, for storing the print data output from said first through fourth register means, respectively.

* * * * *